United States Patent
Kularatna et al.

(10) Patent No.: US 6,904,034 B2
(45) Date of Patent: Jun. 7, 2005

(54) METHOD AND SYSTEM FOR COMMUNICATING DATA BETWEEN A MOBILE COMMUNICATIONS ARCHITECTURE AND A PACKET SWITCHED ARCHITECTURE, EACH UTILIZING A DIFFERENT MODE OF COMMUNICATION

(75) Inventors: Shavantha Kularatna, Flower Mound, TX (US); Shkumbin Hamiti, Espoo (FI); Tuomas Niemela, Helsinki (FI); Basavaraj Patil, Coppell, TX (US); Rayadurgam Ravikanth, Acton, MA (US)

(73) Assignee: Nokia Corporation, Espoo (FI)

( * ) Notice: Subject to any disclaimer, the term of this patent is extended or adjusted under 35 U.S.C. 154(b) by 840 days.

(21) Appl. No.: 09/896,647

(22) Filed: Jun. 29, 2001

(65) Prior Publication Data

US 2003/0002455 A1 Jan. 2, 2003

(51) Int. Cl.⁷ .................................. H04Q 7/24
(52) U.S. Cl. .................. 370/338; 370/328; 370/352; 370/401
(58) Field of Search ................ 370/229–235, 370/338, 352, 401

(56) References Cited

U.S. PATENT DOCUMENTS

| | | | | |
|---|---|---|---|---|
| 6,608,832 B2 | * | 8/2003 | Forslöw | 370/353 |
| 6,711,143 B1 | * | 3/2004 | Balazinski et al. | 370/329 |
| 6,778,500 B1 | * | 8/2004 | Vileid et al. | 370/232 |
| 6,792,270 B1 | * | 9/2004 | Neumann | 455/432.1 |
| 2001/0033563 A1 | * | 10/2001 | Niemela et al. | 370/349 |
| 2002/0082033 A1 | * | 6/2002 | Lohtia et al. | 455/517 |

OTHER PUBLICATIONS

Vaurio et al., "GPRS & UMTS protocols Network Service Between BSS and SGSN". Data Transfer in Future Cellular Networks Report, Tampere University of Technology, Apr. 2000, pp. 5–10.*

* cited by examiner

Primary Examiner—Frank Duong
Assistant Examiner—Michael J. Moore, Jr.
(74) Attorney, Agent, or Firm—Squire, Sanders & Dempsey L.L.P.

(57) ABSTRACT

The invention provides a method and system for allowing communication between a BSS and SGSN, each having an NS-VC table and utilizing a different mode of communication. For example, a BSS may utilize associating UDP with NSE and IP with NS-VC and the SGSN may utilize associating UDP with NS-VC and IP with NSE. The method and system provides for the construction of an NS-VC table correlating the NS-VC table of the BSS and SGSN. Therefore, the method and system provides for the conversion of a data packet having UDP associated with NS-VC and IP associated with NSE to UDP having association with NSE and IP having association with NS-VC and vice versa. An NS-VC table may be constructed from information provided from a negotiations procedure or normal communications. The constructed NS-VC table allows for communications between the mobile communications architecture and the packet switched architecture, without requiring compatible utilization of UDP and IP.

28 Claims, 1 Drawing Sheet

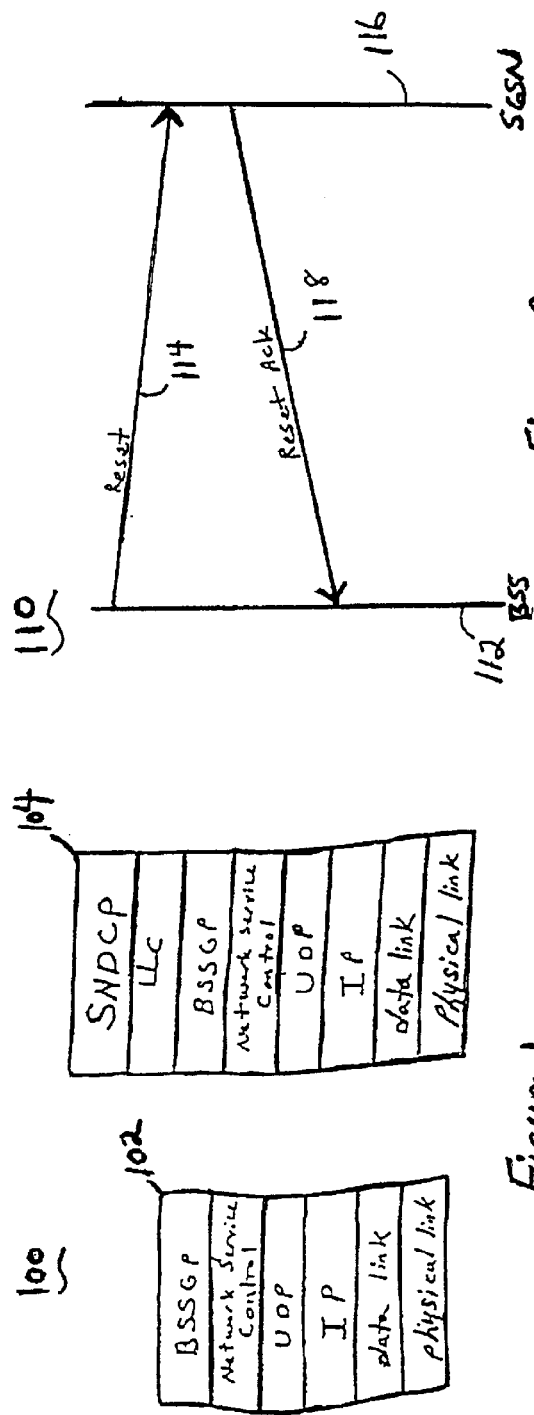
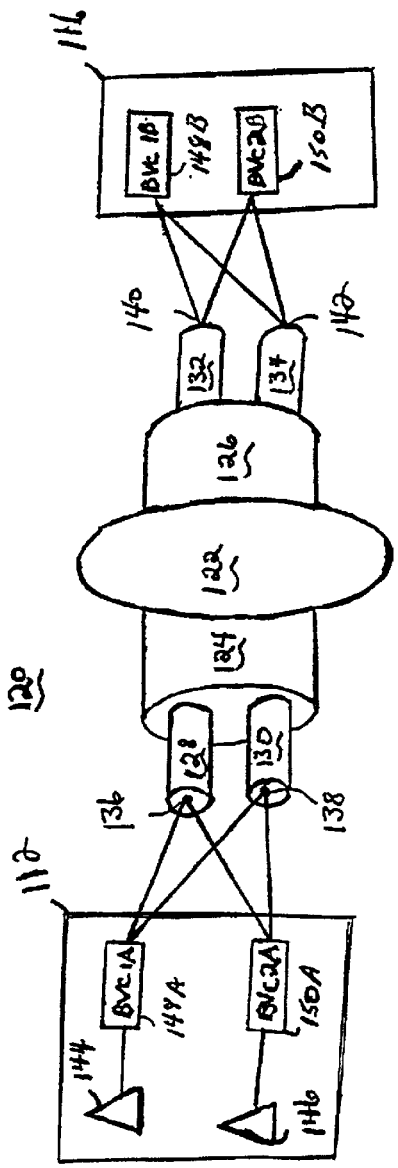

METHOD AND SYSTEM FOR COMMUNICATING DATA BETWEEN A MOBILE COMMUNICATIONS ARCHITECTURE AND A PACKET SWITCHED ARCHITECTURE, EACH UTILIZING A DIFFERENT MODE OF COMMUNICATION

FIELD OF THE INVENTION

The present invention relates, in general, to a method and system for communicating data between a mobile communications architecture and a General Packet Radio Service (GPRS) architecture and, in particular, to a method and system utilizing a network and transport layer protocol for providing communications between a Base Station System (BSS) and a Serving GPRS Support Node (SGSN), each utilizing a different mode of communication.

BACKGROUND OF THE INVENTION

Without limiting the scope of the invention, its background is described in connection with communication protocols defining communication requirements between a mobile communications architecture and a GPRS architecture.

Wireless communication systems, such as a Global Systems for Mobile (GSM) communication architecture, Personal Communications Service (PCS) architecture, and Digital Cellular System (DCS) architecture, are mobile communications architectures that enable wireless communication of information, such as speech, control data and Short Message Service (SMS). Data networks, such as the Internet or intranet, are packet switched architectures that enable a communications device to remotely access services, such as audio video, graphical or simple text applications, on a remote device.

A General Packet Radio Service (GPRS) architecture allows communication devices, such as a mobile phone, mobile computer or Personal Digital Assistance (PDA), access to services provided on a data network. GPRS is a packet switched architecture that enables communication between a mobile communications architecture and a data network, such as the Internet, intranet, or another GPRS network architecture. The GPRS architecture may comprise support nodes coupled to the mobile communications architecture and a Packet Data Network (PDN) where services, such as audio, video or simple text files, residing on a server may be accessed, for example through a router. Standardized protocols define methods of communication between support nodes, the mobile communications architecture, and the PDN.

Data, such as user data, for example audio, video, and text, and signaling data, communicated between the mobile communications architecture and the GPRS architecture may be appended with protocol data according to industry standardized methods. The protocol data provides the routing and control information necessary to allow two system components to communicate. A compatible standardized method of communication is required between system components of the mobile communication architecture and the GPRS architecture in order to allow data transfer. However, more than one standardized method defining communication between common system components may exist and provided by product suppliers.

System components coupling a mobile communications architecture and GPRS architecture must use compatible standardized methods of communication. Without devices that use compatible methods of communication, service providers may be limited by product selection and integration requirements. U.S. patent application Ser. No. 09/784, 954, filed Feb. 16, 2001, and European Telecommunications Standards Institute (ETSI) GSM 08.16 discloses a method and system for communicating data between a mobile communications architecture and a GPRS architecture utilizing UDP and IP. UDP and IP are used for transporting data packets between system components and the methods disclosed each utilize a different technique. Integration of system components requires compatible methods; therefore, current methods of communication between a mobile communications architecture and a GPRS architecture provided may limit integration and product selection.

As may be seen, a method and system providing flexible integration between system components of a mobile communications architecture and a GPRS architecture could provide a useful article of manufacture.

SUMMARY OF THE INVENTION

The present invention provides a method and system for communicating data between a mobile communications architecture and a GPRS architecture, wherein each utilize a different mode of communication.

In an embodiment, the invention provides a system for communicating data between a mobile communications architecture and a GPRS architecture, each having an NS-VC table and each utilizing a different mode of communication. The system comprises a Base Station System (BSS) for sending an indicator indicating a first or second mode of communication. The first mode of communication utilizes associating a User Datagram Protocol (UDP) with a Network Service Entity (NSE) and associating an Internet Protocol (IP) with a Network Service Virtual Connection (NS-VC). The second mode of communication utilizes associating a UDP with NS-VC and associating IP with NSE. The system further comprises a Serving GPRS Support Node (SGSN) for receiving the indicator. The SGSN sends an NS-VC table in response to the received indicator if the indicator indicates the second mode of communication.

In the embodiment, the BSS receives the NS-VC table and constructs a revised NS-VC table. The revised NS-VC table correlates the NS-VC table with the received NS-VC table. The BSS communicates a data packet having UDP and IP. For example, the BSS converts UDP associated with NS-VC and IP associated with NSE to UDP associated with NSE and IP associated with NS-VC utilizing the revised NS-VC table and transmits the data packet to the SGSN. Additionally, the BSS receives the data packet from the SGSN and converts UDP associated with NSE and IP associated with NS-VC to UDP associated with NS-VC and IP associated with NSE utilizing the revised NS-VC table.

In an alternate embodiment, the BSS sends an indicator indicating a first or second mode of communication. The first mode of communication utilizes associating a UDP with a NSE and associating an IP with an NS-VC. The second mode of communication utilizes associating a UDP with NS-VC and associating IP with NSE. The system further comprises a SGSN for receiving the indicator. The SGSN sends an NS-VC table in response to the received indicator if the indicator indicates the second mode of communication. The SGSN communicates a data packet comprising UDP and IP. For example, the SGSN receives the data packet having UDP and IP and constructs a revised NS-VC table correlating the NS-VC table of the SGSN and BSS according to the received data packet. The SGSN converts the data packet from UDP associated with NSE and IP associated with NS-VC to UDP associated with NS-VC and IP associated with NSE utilizing the revised NS-VC table. In addition, the SGSN receives another data packet having UDP and IP. The SGSN converts the another data packet from UDP having an association with NS-VC and IP having an association with NSE to UDP having an association with NSE and IP having an association with NS-VC utilizing the revised NS-VC table.

BRIEF DESCRIPTION OF THE DRAWINGS

For a more complete understanding of the present invention, including its features and advantages, reference is made to the detailed description of the invention, taken in conjunction with the accompanying drawings of which:

FIG. 1 is a protocol structure for a Gb interface having a BSS Gb protocol stack and a SGSN Gb protocol stack;

FIG. 2 is a message sequence diagram identifying the steps for negotiating a mode of communication; and FIG. 3 is an exemplary block diagram of a mobile communications architecture coupled with a General Packet Radio Service (GPRS) architecture.

DETAILED DESCRIPTION OF THE INVENTION

While the use and implementation of particular embodiments of the present invention are presented in detail below, it will be understood that the present invention provides many inventive concepts, which can be embodied in a wide variety of contexts. The specific embodiments discussed herein are merely illustrative of specific ways to make and use the invention and are not intended to limit the scope of the invention.

Turning now to FIG. 1, where a protocol structure for a Gb interface according to an embodiment of the invention is illustrated and denoted generally as 100. Gb interface 100 provides a method of communicating data between a mobile communications architecture, such as a Global System for Mobile (GSM) communications architecture, and a General Packet Radio Service (GPRS) architecture. Gb interface 100 utilizes a network and transport layer protocol to allow for flexible data transmission between the mobile communications architecture and the GPRS architecture, wherein each utilize a different mode of communication.

The mobile communications architecture may comprise a Base Station System (BSS) and the GPRS architecture may comprise a Serving GPRS Support Node (SGSN) coupled to the BSS. The BSS and SGSN communicate according to protocols defined by Gb interface 100. Data communicated between BSS and SGSN is in the form of digitized signals referred to as data packets. The data packets comprising transmission data, such as user data, for example audio, video or text, and signaling data encapsulated with protocol data comprising address and control information. The protocol data provides for routing, relay and node management functions. The protocol data is encapsulated according to a BSS Gb protocol stack 102 and a SGSN Gb protocol stack 104.

BSS Gb protocol stack 102 comprises a Base Station System GPRS Protocol (BSSGP), a Network Service Entity (NSE), and a physical link layer. SGSN Gb protocol stack 104 comprises a Sub-Network Dependent Convergence Protocol (SNDCP), a Logical Link Control (LLC), a BSSGP, a NSE, and a physical link layer. NSE comprises a Network Service Control, a User Datagram Protocol (UDP), Internet Protocol (IP), and a data link layer. The data link layer may be, but not limited to, Frame Relay (FR), Asynchronous Transfer Mode (ATM), Ethernet, Synchronous Optical Network (SONET), or Synchronous Digital Hierarchy (SDH).

A mobile communications device and a SGSN providing service to the mobile communications device create a context table when accessing a remote device on a PDN. The context table may comprise a mobility management context containing network information relating to mobility or security and a Packet Data Packet (PDP) context providing routing information. The context table may comprise a Temporary Logical Link Identifier (TLLI), a Network Service Access Point Identifier (NSAPI), a PDP address, a PDP type, for example IP or X.25, and Quality of Service (QoS) associated with a particular PDP address. Each data packet received by Gb interface 100 can be associated with a context table. The context table allows a mobile communications device to identify a SGSN providing service to a particular PDN or a SGSN to identify a BSS providing service to that particular mobile communications device.

A data packet received by Gb protocol stack 100 having an associated NSAPI and TLLI is encapsulated and de-capsulated according to BSS Gb protocol stack 102 and SGSN Gb protocol stack 104. Encapsulation simply refers to the addition of address and control information to data. De-capsulation simply refers to the removal of the address and control information to reveal the original data. The TLLI and NSAPI are used for routing the data packet between a mobile communications device and remote device located on a PDN through a BSS and a SGSN. The TLLI and NSAPI identify a logical link between a mobile communications device and a SGSN. The NSAPI identifies a Service Access Point (SAP), for example a SGSN and a GGSN providing service to a PDN, or the NSAPI may identify a context table associated with a PDP address and, therefore, the TLLI identifying a mobile communications device.

SNDCP provides for the encapsulation and de-capsulation of address and control information to route data packets between peer SNDCP and functions to improve the efficiency of communication between a mobile communications device and a SGSN. The functions include data compression, data segmenting, multiplexing data onto the LLC layer, data re-assembly, and data decompression functions. SNDCP may include header stripping and header compression options for RTP/UDP/IP headers. SNDCP receives a data packet having an associated NSAPI and multiplexes the received data packet onto an associated Service Access Point Identifier (SAPI) of the LLC. SAPI identifies SAP associated with a NSAPI. Different NSAPI may be associated with the same SAPI. LLC provides logical links identified by the SAPI and determined by the TLLI and NSAPI. LLC provides for sequence control of transmission data, error detection, recovery procedures, notification of unrecoverable errors, flow control, and data ciphering. LLC transports the SAPI and TLLI between a BSS and a SGSN.

The BSSGP performs encapsulation and de-capsulation functions providing routing and control information for the efficient routing of data between peer BSSGP. BSSGP provides for down link and up link flow control and node management. BSSGP provides radio related information used by or derived from an RLC/MAC function of a mobile communications device. Control information provided by the BSSGP also provides a BSS and a SGSN with the necessary data to perform node management functions. NSE performs encapsulation and de-capsulation functions providing address and control information for the efficient routing of data between peer NSE. NSE comprising the network service control, UDP, IP, and data link layer provides transmission and reception service for the BSSGP, load sharing, and virtual circuit management. The transmission path between the BSS and the SGSN may be a single data link or may be through several links traversing an intermediate network.

The peer-to-peer communication between remote BSSGP is performed over a BSSGP Virtual Connection (BVC). A BVC Identifier (BVCI) identifies a BVC. The BVCI may be associated with a cell, a Base Station Controller (BSC), or a BSS. A NSE may provide transport service to a group of BVCI. The NSE is identified by a NSEI. The NSEI together with a BVCI uniquely identifies a BVC. Data transported between peer BSSGP that is related to the same mobile communication device is given a Link Select Parameter (LSP) identifying a virtual link directly connecting a BSS and a SGSN or a virtual link connecting one side of a BSS or SGSN and a intermediate network. The BVCI, NSEI and the LSP are associated with a TLLI and a NSAPI and are provided to the NSE.

The NSE comprising network service control, UDP, IP, and data link layer provides for peer to peer communication between remote NSE. The NSE provides for the routing of data and for virtual circuit management. The provided NSEI is used to determine Network Service Virtual Connections (NS-VC) that provide service to the BVCI. The LSP is used to determine a Network Service Virtual Link (NS-VL) that supports a particular NS-VC. NS-VC is a virtual connection between peer NSE over an NS-VL. Each NS-VC is identified by means of an NS-VC Identifier (NS-VCI). An NS-VL is identified by an NS-VLI. Each physical link supports one or more NS-VL. Each NS-VL is supported by one physical link. For example, in the case of a Frame Relay (FR) network, the physical link is the bearer channel, the NS-VL is the local link of the permanent virtual connection and the NS-VLI is the association of the FR DLCI and bearer channel identifier.

Network service control provides load sharing and NS-VC management. Network service control distributes data among available NS-VC. Network service control provides blocking procedure used by the NSE to inform a peer NSE when an NS-VC becomes unavailable for data transmission. An unblocking procedure is used to remove the blocking restriction after the NS-VC becomes available. A reset procedure is used between peer NSE in order to set an NS-VC to a determined state. A test procedure is used to check that an NS-VC is operating properly between peer NSE.

UDP may provide a source and destination UDP port, in an embodiment, associated with a source and destination NS-VC or, in another embodiment, a source and destination NSE. UDP ports associated with NS-VC may be identified as, either, real time or non-real time services. For example, text and graphics may be identified as non-real time services, whereas audio would be classified as real time services and, therefore, would require priority processing. A Type of Service (ToS) field of IP may be marked to indicate the QoS. IP may provide a source and destination IP address associated with, in an embodiment, a source and destination NS-VC or, in another embodiment, a source and destination NSE.

The data link layer is responsible for how bits are grouped into the data packets and synchronizing the data according to a standard, for example ATM, FR, or SONET. Synchronization functions also may accommodate synchronization patterns to reflect any transmission failures occurring in the physical circuit. The data link layer is responsible for building and providing the information necessary for the physical link layer to relay the data packets between two system components across a single data link. The physical link layer is a bearer channel specified for accommodating data according to the data link layer. The physical link layer is referred to as the bearer channel. The physical link layer is associated with the physical link and the control of the physical link, for example format, power, transmission and re-transmission.

In order to provide flexible, reliable data communication where a mixed mode of communication exists, for example a BSS utilizing a constant UDP per NSE and a SGSN utilizing a constant IP per NSE, a BSS and SGSN may negotiate to provide for a mixed mode of communication. Referring to FIG. 2 where a message sequence diagram identifying the steps for negotiating a mode of communication is illustrated and denoted generally as 110. Message sequence diagram 110 illustrates a BSS 112 providing a data packet in a forward link 114 indicating a mode of communication and a SGSN 116 providing a data packet in a reverse link 118 indicating acknowledgement. BSS 112 provides a data packet in forward link 114 having parameters indicating a mode of communication. The parameter value indicates, either, a constant UDP per NSE or constant IP per NSE. SGSN 116 acknowledges' by providing an NS-VC table if SGSN 116 utilizes a constant UDP per NSE and BSS 112 utilizes a constant IP per NSE. If the parameter value indicates a constant IP per NSE, SGSN 116 does not provide an NS-VC table. In this case, SGSN 116 applies implicit path negotiation to associate UDP and IP to appropriate NSE and NS-VC. Although FIG. 2 illustrates BSS 112 initiating communication, in an alternate embodiment, SGSN 116 may initiate communication. In the alternate embodiment, BSS 112 would provide an NS-VC table if SGSN 116 utilizes a constant UDP per NSE and BSS 112 utilizes a constant IP per NSE. In the alternate embodiment, if SGSN 116 utilizes a constant IP per NSE and BSS 112 utilizes a constant UDP per NSE, SGSN 116 would utilize implicit path negotiation to associate UDP and IP with appropriate NSE and NS-VC.

Turning now to FIG. 3, where a system utilizing a mixed mode of communication is illustrated and denoted generally as 120. System 120 may comprise BSS 112 for communicating with a mobile communications device, such as a GPRS enabled phone or computer, and a SGSN 116 coupled to BSS 112 allowing for the communication of data between the mobile communications device and a communications device residing on a Packet Data Network (PDN), such as the Internet or an intranet. System 120 allows data communication between BSS 112 and SGSN 116, wherein each utilize a different mode of communication provided by Gb interface 100.

BSS 112 may be directly coupled to SGSN 116 or coupled through an intermediate network 122. Intermediate network 122 may comprise bearer channels 124 and 126 for allowing BSS 112 and SGSN 116 access to intermediate network 122. Bearer channel 124 having NS-VL 128 and 130 and bearer channel 126 having NS-VL 132 and 134 and NS-VL 128 and 130 having NS-VC 136 and 138 and NS-VL 132 and 134 having NS-VC 140 and 142. Although each side of intermediate network 122, as illustrated, only comprises one bearer channel, two NS-VL, and two NS-VC, it should be understood by someone skilled in the art that intermediate network 122 may comprise multiple channels, with each channel having multiple NS-VL, and each NS-VL comprising NS-VC.

A defined geographic region serviced by BSS 112 may comprise several small geographic regions, with each smaller geographic region referred to as a cell. BSS 112 may comprise a cell 144 and 146 each having a Base Transceiver Station (BTS) providing transmission and reception for mobile communication devices. BSS 112 may further comprise a Base Station Controller (BSC) for switching data to and from each BTS. In this embodiment, cell 144 is associated with BVC 148A and 148B and cell 146 is associated with BVC 150A and 150B. In other embodiments, the BVC may be associated with a BSC or a BSS. Although the mobile communications architecture and GPRS architecture are each illustrated with two BVC, it should be understood by someone skilled in the art that system 120 may comprise several BVC.

NSE of Gb interface 100 utilizing UDP and IP associates UDP ports and IP addresses with NS-VC 140,142, 136 and 138 and associated NSE for peer to peer communication between BVC 148A and 148B and peer to peer communication between BVC 150A and 150B. UDP provides a source and destination UDP port associated with, either, a source and destination NS-VC or a source and destination NSE. IP provides a source and destination IP address associated with, either, a source and destination NS-VC or a source and destination NSE. BSS 112 or SGSN 116 utilizing a mode of communication, wherein UDP ports are associated with NS-VC, may have UDP ports identified as, either, real time or non-real time services. For example, text and graphics may be identified as non-real time services, whereas audio would be classified as real time services and, therefore, would require priority processing. A Type of Service (ToS) field of IP may be marked to indicate the QoS.

In an embodiment, BSS 112 may communicate utilizing a single UDP per NSE and SGSN may communicate utilizing a single IP per NSE, each, BSS 112 and SGSN 116, having an NS-VC table identifying UDP ports or IP addresses associated with NS-VC and NSE. If BSS 112 initiates communication, SGSN 116 utilizes implicit path negotiation to associate UDP and IP to appropriate NSE and NS-VC. For example, a revised NS-VC table may be constructed correlating the NS-VC table of BSS 112 and SGSN 116 according to the received data packet. A constructed NS-VC table comprising original NS-VC configurations of SGSN 116 and NS-VC configurations of BSS 112 constructed according to the received data packet may be used to associate UDP and IP accordingly. Therefore, SGSN 116 may convert data packets having UDP associated with NSE and IP associated with NS-VC to UDP associated with NS-VC and IP associated with NSE according to the revised NS-VC table. Data packets to be communicated to BSS 112 may be converted from UDP associated with NS-VC and IP associated with NSE to UDP associated with NSE and IP associated with NS-VC utilizing the revised NS-VC table.

In an alternative embodiment, BSS 112 may communicate data utilizing a single IP per NSE having UDP associated with NS-VC and SGSN may communicate utilizing a single UDP per NSE having IP associated with NS-VC. If BSS 112 initiates communication, SGSN 116 provides an NS-VC table to BSS 112. A revised NS-VC table may be constructed correlating the NS-VC table of BSS 112 and the received NS-VC table. The revised NS-VC table may allow BSS 112 to convert data packets to be communicated to SGSN 116 and having UDP associated with NS-VC and IP associated with NSE to having UDP associated with NSE and IP associated with NS-VC. Additionally, the revised NS-VC table allows BSS 112 to convert data packets communicated from SGSN 116 and having UDP associated with NSE and IP associated with NS-VC to having UDP associated with NS-VC and IP associated with NSE.

While this invention has been described with reference to particular embodiments, this description is not intended to be limiting. Various modifications and combinations of the illustrative embodiments, as well as other embodiments of the invention, will be apparent to persons skilled in the art. It is, therefore, intended that the appended claims encompass any such modifications or embodiments.

What is claimed is:

1. A method of communicating data between a Base Station System (BSS) and a Serving GPRS Support Node (SGSN), each having a Network Service Virtual Connection (NS-VC) table and each utilizing an opposite mode of communication, the method comprising the steps of:

sending an indicator indicating a first or second mode of communication, the first mode of communication utilizes associating a first User Datagram Protocol (UDP) with a first Network Service Entity (NSE) and associating a first Internet Protocol (IP) with a first Network Service Virtual Connection (NS-VC), the second mode of communication utilizes associating a second UDP with a second NS-VC and associating a second IP with a second NSE;

receiving the indicator;

sending an NS-VC table in response to receiving the indicator if the indicator indicates the second mode of communication; and communicating a data packet comprising the first UDP and the first IP or the second UDP and the second IP.

2. The method of communicating data as recited in claim 1, wherein the step of communicating a data packet further comprises the steps:

receiving the NS-VC table;

constructing a revised NS-VC table, the revised NS-VC table correlating the NS-VC table with the received NS-VC table.

3. The method of communicating data as recited in claim 2, wherein the step of communicating a data packet further comprises the steps of:

converting the data packet having the second UDP associated with the second NS-VC and the second IP associated with the second NSE to having the second UDP associated with the second NSE and the second IP associated with the second UDP according to the revised NS-VC table; and transmitting the data packet.

4. The method of communicating a data packet as recited in claim 3, wherein the data packet further comprises:

a Base Station System GPRS Protocol (BSSGP);

a network service control;

a data link layer; and a physical link layer.

5. The method of communicating data as recited in claim 4, wherein the data packet further comprises:

a Sub-network Dependent Convergence Protocol (SNDCP); and a Logical Link Control (LLC).

6. The method of communicating data as recited in claim 2, wherein the step of communicating a data packet further comprises the steps of:

receiving the data packet; and converting the data packet having the first UDP associated with the first NSE and the first IP associated with the first NS-VC to having the first UDP associated with the first NS-VC and the first IP associated with the first NSE according to the revised NS-VC table.

7. The method of communicating a data packet as recited in claim 6, wherein the data packet further comprises:
 a Base Station System GPRS Protocol (BSSGP);
 a network service control;
 a data link layer; and
 a physical link layer.

8. The method of communicating data as recited in claim 7, wherein the data packet further comprises:
 a Sub-network Dependent Convergence Protocol (SNDCP); and
 a Logical Link Control (LLC).

9. The method of communicating data as recited in claim 1, wherein the step of communicating further comprises the steps of:
 receiving the data packet;
 constructing a revised NS-VC table, the revised NS-VC table correlating the NS-VC tables of the BSS and the SGSN according to the data packet; and
 converting the data packet from the first UDP having an association with the first NSE and the first IP having an association with the first NS-VC to the first UDP having an association with the first NS-VC and the first IP having an association with first NSE utilizing the revised NS-VC table.

10. The method of communicating a data packet as recited in claim 9, wherein the data packet further comprises:
 a Base Station System GPRS Protocol (BSSGP);
 a network service control;
 a data link layer; and
 a physical link layer.

11. The method of communicating data as recited in claim 10, wherein the data packet further comprises:
 a Sub-network Dependent Convergence Protocol (SNDCP); and
 a Logical Link Control (LLC).

12. The method of communicating data as recited in claim 1, wherein the step of communicating a data packet further comprises the steps of:
 receiving another data packet;
 converting the an other data packet from the second UDP having an association with the second NS-VC and the second IP having an association with the second NSE to the second UDP having an association with the second NSE and second IP having an association with the second NS-VC utilizing the revised NS-VC table; and
 transmitting the data packet.

13. The method of communicating a data packet as recited in claim 12, wherein the data packet further comprises:
 a Base Station System GPRS Protocol (BSSGP);
 a network service control;
 a data link layer; and
 a physical link layer.

14. The method of communicating data as recited in claim 13, wherein the data packet further comprises:
 a Sub-network Dependent Convergence Protocol (SNDCP); and
 a Logical Link Control (LLC).

15. A system for communicating data between a mobile communications architecture and a GPRS architecture, each having a Network Service Virtual Connection (NS-VC) table and each utilizing a different mode of communication, the system comprising:
 a Base Station System (BSS) for sending an indicator indicating a first or second mode of communication, the first mode of communication utilizes associating a first User Datagram Protocol (UDP) with a first Network Service Entity (NSE) and associating a first Internet Protocol (IP) with a first Network Service Virtual Connection (NS-VC), the second mode of communication utilizes associating a second UDP with a second NS-VC and associating a second IP with a second NSE;
 a Serving GPRS Support Node (SGSN) receives the indicator, the SGSN sends a NS-VC table in response to the received indicator if the indicator indicates the second mode of communication, and
 the BSS communicates a data packet comprising the first UDP and the first IP or a data packet comprising the second UDP and the second IP.

16. The system for communicating data as recited in claim 15, wherein the BSS receives the NS-VC table and constructs a revised NS-VC table, the revised NS-VC table correlates the NS-VC table with the received NS-VC table.

17. The system for communicating data as recited 16, wherein the BSS receives the data packet and converts the first UDP associated with the first NSE and the first IP associated with the first NS-VC to the first UDP associated with the first NS-VC and the first IP associated with the first NSE utilizing the revised NS-VC table.

18. The system for communicating data as recited in claim 17, wherein the data packet further comprises:
 a Sub-network Dependent Convergence Protocol (SNDCP);
 a Logical Link Control (LLC);
 a Base Station System GPRS Protocol (BSSGP);
 a network service control;
 a data link layer; and
 a physical link layer.

19. The system for communicating data as recited in claim 16, wherein the BSS receives another data packet having the second UDP associated with the second NS-VC and the second IP associated with the second NSE to the second UDP associated with the second NSE and the second IP associated with second NS-VC utilizing the revised NS-VC table.

20. The system for communicating data as recited in claim 19, wherein the BSS transmits the data packet.

21. The system for communicating data as recited in claim 20, wherein the data packet further comprises:
 a Base Station System GPRS Protocol (BSSGP);
 a network service control;
 a data link layer; and
 a physical link layer.

22. A system for communicating data between a mobile communications architecture and a GPRS architecture, each having a Network Service Virtual Connection (NS-VC) table and each utilizing a different mode of communication, the system comprising:
 a Base Station System (BSS) for sending an indicator indicating a first or second mode of communication, the first mode of communication utilizes associating a first User Datagram Protocol (UDP) with a first Network Service Entity (NSE) and associating a first Internet Protocol (IP) with a first Network Service Virtual Connection (NS-VC), the second mode of communication utilizes associating a second UDP with a second NS-VC and associating a second IP with a second NSE;

a Serving GPRS Support Node (SGSN) receives the indicator, the SGSN sends a NS-VC table in response to the received indicator if the indicator indicates the second mode of communication, and the SGSN communicates a data packet comprising the first UDP and first IP or the second UDP and the second IP.

23. The system for communicating data as recited in claim 22, wherein the SGSN receives the data packet having the first UDP and the first IP and constructs a revised NS-VC table correlating the NS-VC table of the SGSN and BSS according to the received data packet.

24. The system for communicating data as recited in claim 23, wherein the SGSN converts the data packet from the first UDP associated with the first NSE and the first IP associated with first NS-VC to the first UDP associated with the first NS-VC and the first IP associated with first NSE utilizing the revised NS-VC table.

25. The system for communicating data as recited in claim 24, wherein the data packet further comprises:

a Base Station System GPRS Protocol (BSSGP);

a network service control;

a data link layer; and a physical link layer.

26. The system for communicating data as recited in claim 23, wherein the SGSN receives another data packet having the second UDP and the second IP and converts the another data packet to the second UDP having an association with second NSE and the second IP having an association with the second NS-VC utilizing the revised NS-VC table.

27. The system for communicating data as recited in claim 25, wherein the SGSN transmits the data packet.

28. The system for communicating data as recited in claim 26, wherein the data packet further comprises;

a Sub-network Dependent Convergence Protocol (SNDCP);

a Logical Link Control (LLC);

a Base Station System GPRS Protocol (BSSGP);

a network Service control;

a data link layer; and a physical link layer.

* * * * *